(12) United States Patent
Takagi et al.

(10) Patent No.: US 11,204,500 B2
(45) Date of Patent: Dec. 21, 2021

(54) VIRTUAL IMAGE DISPLAY DEVICE

(71) Applicant: SEIKO EPSON CORPORATION, Tokyo (JP)

(72) Inventors: Masayuki Takagi, Azumino (JP); Akira Komatsu, Kamiina-gun (JP); Takashi Takeda, Suwa (JP); Toshiaki Miyao, Matsumoto (JP); Tokito Yamaguchi, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 160 days.

(21) Appl. No.: 16/130,641

(22) Filed: Sep. 13, 2018

(65) Prior Publication Data

US 2019/0079234 A1 Mar. 14, 2019

(30) Foreign Application Priority Data

Sep. 14, 2017 (JP) .............................. JP2017-176455

(51) Int. Cl.
*G02B 27/01* (2006.01)
*G02B 5/30* (2006.01)

(52) U.S. Cl.
CPC ....... *G02B 27/0172* (2013.01); *G02B 5/3058* (2013.01); *G02B 5/3083* (2013.01); *G02B 5/3016* (2013.01)

(58) Field of Classification Search
CPC .............. G02B 27/0172; G02B 5/3083; G02B 5/3016; B29C 33/30; B29C 33/485
USPC ........................ 359/485.05; 264/2.5; 425/808
See application file for complete search history.

(56) References Cited

U.S. PATENT DOCUMENTS

| | | | |
|---|---|---|---|
| 5,644,436 A * | 7/1997 | Togino | G02B 13/18 359/730 |
| 5,966,242 A | 10/1999 | Yamanaka | |
| 6,094,242 A | 7/2000 | Yamanaka | |
| 6,271,969 B1 | 8/2001 | Mertz | |
| 9,555,589 B1 * | 1/2017 | Ambur | G02B 27/0068 |
| 2002/0024743 A1 | 2/2002 | Endo et al. | |
| 2002/0057498 A1 | 5/2002 | Kobayashi et al. | |
| 2015/0205035 A1 * | 7/2015 | Border | G02B 27/283 362/19 |
| 2017/0242258 A1 * | 8/2017 | Edwards | G02B 27/027 |
| 2018/0031835 A1 * | 2/2018 | Hoppe | G02F 1/13363 |
| 2019/0079299 A1 | 3/2019 | Miyao et al. | |

(Continued)

FOREIGN PATENT DOCUMENTS

| | | |
|---|---|---|
| JP | S59-9023 A | 1/1984 |
| JP | H10-010465 A | 1/1998 |

(Continued)

OTHER PUBLICATIONS

OPK4 data sheet, Osaka Gas Chemicals (2015).*

*Primary Examiner* — Kristina M Deherrera
(74) *Attorney, Agent, or Firm* — Oliff PLC

(57) ABSTRACT

A half mirror 21 provided in an optical path bends the optical path, and a semi-transmissive polarizing plate 23 increases the transmittance of image light GL in a direction along alignment of the eyes of an observer while the virtual image display device has a wide angle of view and is downsized, thus reducing luminance unevenness between the central region and the peripheral region in the image in the direction and allowing the observer to view a high quality image.

14 Claims, 14 Drawing Sheets

(56) References Cited

U.S. PATENT DOCUMENTS

| | | | |
|---|---|---|---|
| 2019/0265493 A1 | 8/2019 | Takagi et al. | |
| 2019/0265494 A1 | 8/2019 | Takagi et al. | |
| 2020/0096780 A1* | 3/2020 | Ouderkirk | G02B 17/0856 |

FOREIGN PATENT DOCUMENTS

| | | |
|---|---|---|
| JP | 2001-356295 A | 12/2001 |
| JP | 2002-107655 A | 4/2002 |
| JP | 3295583 B2 | 6/2002 |
| JP | 2003-035881 A | 2/2003 |
| JP | 4408159 B2 | 2/2010 |
| JP | 2019-053151 A | 4/2019 |
| JP | 2019-148626 A | 9/2019 |
| JP | 2019-148627 A | 9/2019 |
| WO | 2017/022670 A1 | 2/2017 |

* cited by examiner

VIRTUAL IMAGE DISPLAY DEVICE

The present application is based on and claims priority from JP Application Serial Number 2017-176455, filed Sep. 14, 2017, the disclosure of which is hereby incorporated by reference herein in its entirety.

BACKGROUND

1. Technical Field

The disclosure relates to a virtual image display device to be mounted on the head to present an image formed by an image element and the like to an observer.

2. Related Art

There is known a virtual display device (or a head-mounted display device) such as a head-mounted display (hereinafter, also referred to as an HMD) to be mounted on the head of an observer, for example, a type of closed, wide viewing display device that includes a thin, wide-angle optical system by the provision of a partial optical returning portion using a half mirror (refer to Japanese Patent Nos. 3295583 and 4408159).

However, applying a thin, wide-angle optical system to an HMD makes the whole optical system complicated, thus causing a degraded image due to, for example, luminance unevenness and the like. Regarding image unevenness, assuming that a direction parallel to the alignment of the eyes is referred to as a horizontal direction and a direction perpendicular the horizontal direction is referred to as a vertical direction, it is easier for the human eyes to sense color unevenness or luminance unevenness in the horizontal direction than in the vertical direction. Accordingly, there is a demand to reduce image unevenness in the horizontal direction.

Furthermore, in some cases, a degraded image is caused by ghost light due to, for example, the partial optical returning portion using the half mirror.

SUMMARY

The disclosure provides a small-sized, wide viewing virtual image display device configured to allow an observer to view a high quality image.

A first virtual image display device according to the disclosure includes an image element configured to display an image, a display-side lens, on which image light from the image element is incident, an observer-side lens provided after the display-side lens to collect the image light from the display-side lens to emit collected image light to a front side of an eye of an observer, a half mirror provided before the display-side lens, and a semi-transmissive polarizing plate provided between the display-side lens and the observer-side lens and having a polarizing transmission axis in a horizontal direction that is a direction of alignment of the eyes of the observer.

In the virtual image display device, while the half mirror provided in an optical path bends the optical path and thus the virtual image display device has a wide angle of view and is downsized, the semi-transmissive polarizing plate may increase the transmission of the image light in the direction along the alignment of the eyes of the observer, thus reducing luminance unevenness between the central region and the peripheral region in the image in that direction to allow the observer to view a high quality image.

In a specific aspect of the disclosure, the virtual image display device may further include a polarization converting member provided before the semi-transmissive polarizing plate, configured to convert a polarization state of passing light. In this aspect, the polarization state of the component of light to enter the semi-transmissive polarizing plate can be converted.

In another aspect of the disclosure, the polarization converting member may be a ¼ wavelength plate and be provided between the display-side lens and the semi-transmissive polarizing plate, and configured to convert a component of light traveling toward the semi-transmissive polarizing plate into linearly-polarized light. In this aspect, the polarization state of the component traveling between the display-side lens and the semi-transmissive polarizing plate is properly converted, and thus ghost light can be prevented from occurring.

In still another aspect of the disclosure, the semi-transmissive polarizing plate may be a reflective wire-grid polarizing plate. In this aspect, the image light is very efficiently reflected and transmitted depending on the polarization state of the image light.

In still another aspect of the disclosure, the half mirror may have a concave curved shape when viewed from the observer side. In this aspect, light reflection system using the half mirror makes it easy to reduce the thickness of the virtual image display device.

In still another aspect of the disclosure, at least one of the display-side lens and the observer-side lens may be a resin lens having at least one of an oriented birefringence of not greater than 0.01 and not less than −0.01 and a photoelastic constant of not greater than 10 $[10^{-12}/Pa]$. In this aspect, birefringence can be prevented from occurring and aberration due to material and the like can be suppressed. Thus, the weights of the respective lenses and also the whole device can be reduced while optical performance is maintained to increase image quality. In the disclosure, the resin lens may be sometimes referred to as zero birefringence or low birefringence.

In still another aspect of the disclosure, the resin lens may be disposed with a gate side of the resin lens during molding facing upward when the virtual image display device is worn. In this aspect, a portion subjected to high residual stress in the resin lens is prevented from affecting visibility.

In still another aspect of the disclosure, the resin lens may be disposed with a gate side of the resin lens during molding facing the nose of the observer when the virtual image display device is worn. In this aspect, a portion subjected to high residual stress in the resin lens is prevented from affecting visibility. Furthermore, in this aspect, display field of the image light is set to be smaller in a region on the nose side than in other regions.

In still another aspect of the disclosure, the resin lens may have a D shape with a cut face on the gate side of the resins lens during molding. In this aspect, a face of a resin lens that is cut to have a D shape is arranged facing upward or facing the nose of the observer when the virtual image display device is worn, on the gate side in the molding.

In still another aspect of the disclosure, the semi-transmissive polarizing plate and the resin lens may be bonded to each other to correspond a gate direction of the resin lens to a direction of a transmission axis of the semi-transmissive polarizing plate. In this aspect, the semi-transmissive polarizing plate and the resin lens can be handled as one unit without affecting visibility.

In still another aspect of the disclosure, at least one of the display-side lens and the observer-side lens may be a glass lens. In this aspect, birefringence is prevented from occurring, and thus optical performance is maintained.

In still another aspect of the disclosure, the display-side lens may be a refracting lens having a refractive index of 1.55 or more. In this aspect, an image can be presented at a sufficiently wide angle of view.

In still another aspect of the disclosure, the image element may include a self light-emitting element to emit circularly-polarized image light. In this aspect, the image element can emit image light as circularly-polarized light.

In still another aspect of the disclosure, the image element may include a polarizing plate configured to convert the image light to be emitted into linearly-polarized light, and a ¼ wavelength plate configured to convert a component of light passed through the polarizing plate into circularly-polarized light. In this aspect, by the ¼ wavelength plate, which converts the component of light emitted from the polarizing plate into circularly-polarized light, the image light can be emitted as the circularly-polarized light.

In still another aspect of the disclosure, the virtual image display device may further include an achromatic lens provided before the display-side lens. In this aspect, color unevenness can be prevented from occurring.

In still another aspect of the disclosure, the virtual image display device may further include a front lens provided immediately after the image element, and configured to emit the image light emitted from the image element. In this aspect, the front lens can make an image presented at a sufficiently wide angle of view.

In a specific aspect of the disclosure, the virtual image display device may further include a circularly-polarized light converting member provided between the semi-transmissive polarizing plate and the observer-side lens, and configured to convert a polarizing state of the image light emitted from the semi-transmissive polarizing plate into circularly-polarized light. In this aspect, the circularly-polarized light converting member can convert the image light emitted from the semi-transmissive polarizing plate into circularly-polarized light to emit the resulting light to the observer-side lens.

A second virtual image display device according to the disclosure includes an image element configured to display an image, a lens configured to collect image light from the image element, a half mirror provided before the lens, a polarization converting member provided after the lens to convert a polarization state of passing light, and a semi-transmissive polarizing plate provided after the polarization converting member and having a polarizing transmission axis in a horizontal direction that is a direction of alignment of eyes of an observer.

In the virtual image display device, while the half mirror provided in an optical path bends the optical path and thus the virtual image display device has a wide angle of view and is downsized, the polarization converting member provided between the half mirror and the semi-transmissive polarizing plate properly converts the polarization state of the component traveling between the half mirror and the semi-transmissive polarizing plate and thus ghost light is prevented from occurring to allow the observer to view a high quality image.

BRIEF DESCRIPTION OF THE DRAWINGS

Embodiments of the disclosure will be described with reference to the accompanying drawings, wherein like numbers reference like elements.

DESCRIPTION OF EXEMPLARY EMBODIMENTS

First Exemplary Embodiment

A virtual image display device according to First Exemplary Embodiment of the disclosure will be described in detail below with reference to FIG. 1 and the like.

Figure 1:
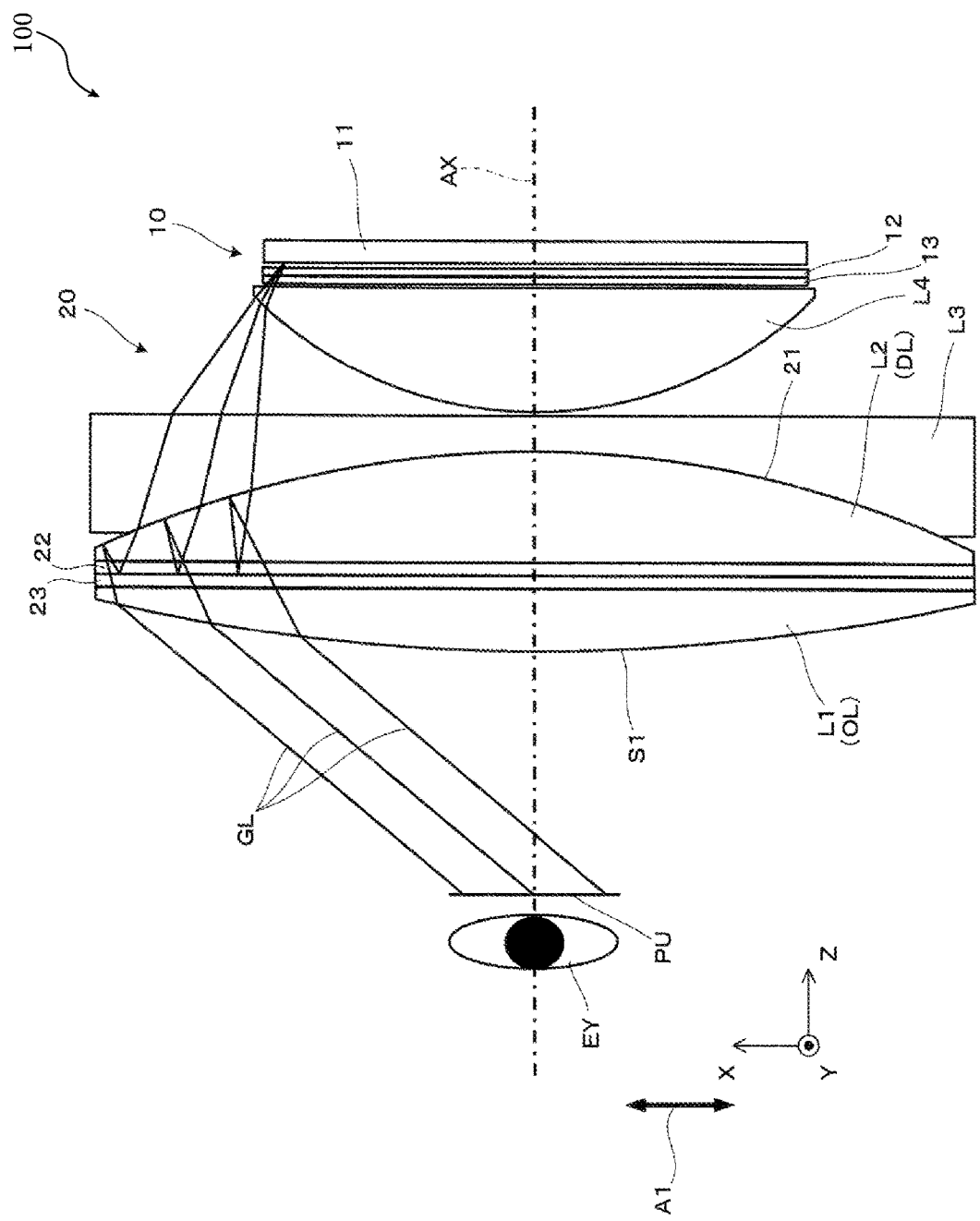
FIG. 1 conceptually illustrates a virtual image display device according to First Exemplary Embodiment and an optical path of image light.

As conceptually illustrated in FIG. 1, a virtual image display device 100 of First Exemplary Embodiment includes an image display unit 10 that is an image element (image display unit) and a magnification optical system 20. The virtual image display device 100 is also a virtual image display device that allows an observer or a user who wears the virtual image display device 100 to view picture light (image light) of a virtual image, that is, a head-mounted display (HMD). FIG. 1 illustrates the virtual image display device 100 being worn by the observer, when viewed from above, where an optical axis AX of the optical system in the virtual image display device 100 is a Z direction. Furthermore, a horizontal direction, which is regarded as the direction of alignment of the left and right eyes of the observer, is an X direction. A vertical direction, which is perpendicular to the horizontal direction and is also the up-and-down direction of the observer, is a Y direction in FIG. 1.

The image display unit 10 and the magnification optical system 20 are configured as a pair of left and right for the left eye and the right eye in the left-and-right direction, respectively. However, due to symmetry, one of the left and right is illustrated (for the left eye) but the other is omitted. In FIG. 1, the +X side corresponds to the outside (the ear side), and the −X side corresponds to the inside (the nose side). Only one of a pair of left and right, i.e. a single unit, can function as the virtual image display device. In other words, the virtual image display device may be configured for a single eye without a pair of left and right configuration.

An example of the structures and the like of components for guiding image light in the virtual image display device 100 is conceptually described below.

The image display unit 10 includes a panel 11 that is a main body part configured to perform image formation, a polarizing plate 12 that is configured to extract a component of linearly-polarized light, and a first ¼ wavelength plate (λ/4 plate) 13 that is configured to convert the component passing through the polarizing plate 12 into circularly-polarized light to emit the converted component.

The panel 11 may be an image element (an image display element) configured with, for example, a self light-emitting element (OLED) such as an organic electroluminescent element. The panel 11 may include an image display element (an image element) serving as a transmissive spatial light modulator or further include an illumination device (not illustrated) serving as a back light to illuminate the image display element with illumination light and/or a drive controller (not illustrated) to control their operations.

The polarizing plate 12 converts image light to be emitted, of the light emitted from the panel 11, into linearly-polarized light. In addition, the first ¼ wavelength plate 13 converts the component emitted from the polarizing plate 12 into circularly-polarized light.

With that configuration, the image display unit 10 emits image light GL that is circularly-polarized light.

The magnification optical system 20 includes four lenses, first lens L1 to fourth lens L4 that are arranged sequentially from the observer side, and also a half mirror 21, a polarization converting member 22, and a semi-transmissive polarizing plate 23. The first lens L1 to the fourth lens L4 are each configured with any one of a glass lens, a zero-birefringence resin lens, and a low-birefringence resin lens (i.e., a resin lens having an oriented birefringence of not greater than 0.01 and not less than −0.01 or a photoelastic constant of not greater than 10 [$10^{-12}$/Pa]), and thus birefringence is less likely to occur.

The first lens L1 is an observer-side lens OL that is disposed at a position closest to a pupil position PU to be assumed as the position of the eye EY of the observer in the magnification optical system 20. Specifically, the first lens L1, which is the observer-side lens OL, is a convex lens configured to collect the image light GL to emit the collected light to the front side of the eye of the observer.

The second lens L2 is disposed before the first lens L1 (front stage) in their relative positions, that is, on the upstream side of the optical path of the image light GL, and configured to make the image light GL emitted from the image display unit 10 enter optical members including the first lens L1 and the like that are disposed after the second lens L2 (rear stage), that is, on the downstream of the optical path. The second lens L2 is also referred to as a display-side lens DL with respect to the observer-side lens OL (the first lens L1). The second lens L2 is a convex lens serving as a refractive lens having a refractive index of, for example, 1.55 or greater, thus an image can be presented at a sufficiently wide angle of view.

The third lens L3 is provided before the second lens L2, which is the display-side lens DL, and is an achromatic lens with its properties such as Abbe number adjusted as appropriate. The third lens L3 is a concave lens that is bonded to the second lens L2 to serve as an achromatic lens. In particular, the third lens L3 is bonded to the second lens L2 such that the half mirror 21 is interposed between the third lens L3 and the second lens L2. In other words, the third lens L3, which has a low Abbe number, i.e., negative power, is disposed between the half mirror 21 and the semi-transmissive polarizing plate 23, and thus color aberration is prevented from occurring.

The fourth lens L4 is a convex lens that is provided immediately after the image display unit 10, and configured to emit the image light GL from the image display unit 10 to the optical members including the third lens L3, which are disposed after the fourth lens L4. In other words, the fourth lens L4 is a front-side lens that is disposed at a position closest to the image display unit 10 and configured to adjust the optical path of the image light GL, in the magnification optical system 20. The fourth lens L4 enhances resolution performance more and also reduces the panel size of the image display unit 10. Thus, the production cost of the image display unit 10 is reduced. In addition, the telecentric angle of a light beam emitted from the image display unit 10 is reduced, and thus luminance and chromaticity are prevented from varying depending on the viewing angle characteristic of the panel.

The half mirror 21 is a semi-reflective and semi-transmissive film that are configured to transmit a part of the image light and reflects the other part of the image light, and is configured with, for example, a dielectric multilayer. As illustrated or described above, the half mirror 21 is arranged between the second lens L2 and the third lens L3, and has a concave curved shape, when viewed from the observer side.

The polarization converting member 22 is a member configured to convert the polarization state of passing light, and include a ¼ wavelength plate (a second ¼ wavelength plate or a second λ/4 plate). The polarization converting member 22 is provided between the display-side lens DL and the semi-transmissive polarizing plate 23 and configured to convert the polarization state of the component, traveling between the polarization converting member 22 and the half mirror 21, such as component traveling to the semi-transmissive polarizing plate 23. Specifically, the image light GL in the circular polarization state is converted into linearly-polarized light, or conversely, the image light GL in the linear polarization state is converted into circularly-polarized light.

The semi-transmissive polarizing plate 23 is a member provided between the display-side lens DL and the observer-side lens OL, and is configured with a reflective wire-grid polarizing plate. In particular, in First Exemplary Embodiment, a direction A1 of the polarizing transmission axis of the semi-transmissive polarizing plate 23, which is a wire-grid polarizing plate, is the horizontal direction (the X direction) assumed as the direction of alignment of the eyes. The semi-transmissive polarizing plate 23, which is configured with a reflective wire-grid polarizing plate, changes transmission and reflection characteristics depending on the polarization state of an incident component, and is also referred to as a reflective polarizing plate.

Next, the outline of the optical path of the image light GL is described. As described above, the semi-transmissive polarizing plate (or reflective polarizing plate) 23, which is configured with a reflective wire-grid polarizing plate, has a polarizing transmission axis the direction of which is the horizontal direction (the X direction). In other words, the semi-transmissive polarizing plate 23 has characteristics that transmit a polarization component in the X direction and reflects a component perpendicular to the X direction. The optical path of the image light GL illustrated in FIG. 1 passes in a plane parallel to the XZ plane. Therefore, in FIG. 1, for defining p-polarized light and s-polarized light, an incident surface is parallel to the XZ plane, and a boundary surface is perpendicular to the XZ plane (i.e., parallel to the Y direction). The semi-transmissive polarizing plate 23 transmits p-polarized light and reflects s-polarized light.

With the configuration described above, the image light GL modulated and emitted by the panel 11 of the image display unit 10 is converted into p-polarized light by the polarizing plate 12, which is a transmissive wavelength plate, and further converted into circularly-polarized light by the first ¼ wavelength plate 13, and then emitted to the magnification optical system 20. After that, in the magnification optical system 20, the image light GL passes through the fourth lens L4, enters the third lens L3, and then reaches the half mirror 21 formed on the boundary surface between the second lens L2 and the third lens L3. Some components of the image light GL pass through the half mirror 21, is converted into s-polarized light by the polarization converting member 22, which is a second ¼ wavelength plate, and then reach the semi-transmissive polarizing plate (or reflective polarizing plate) 23. The s-polarized image light GL is reflected by the semi-transmissive polarizing plate 23, again converted into circularly-polarized light by the polarization converting member 22, and then reaches the half mirror 21. While some components of the image light GL pass through the half mirror 21, the other components of the image light GL are reflected by the half mirror 21, and the reflected components of the image light GL are then converted into p-polarized light by the polarization converting member 22. The p-polarized components of the image light GL pass through the semi-transmissive polarizing plate 23, and then reach the first lens L1 (the observer-side lens OL). The image light GL passes through the first lens L1, and then reaches the pupil position PU that is assumed as the position of the eye EY of the observer.

As described above, in First Exemplary Embodiment, while the half mirror 21 provided in an optical path in the virtual image display device 100 bends the optical path and thus the virtual image display device 100 has a wide angle of view and is downsized, the polarization converting member 22 provided between the half mirror 21 and the semi-transmissive polarizing plate 23 properly converts the polarization state of the component traveling between the half mirror 21 and the semi-transmissive polarizing plate 23 and thus ghost light is prevented from occurring to allow the observer to view a high quality image.

As illustrated, a component of the image light GL emitted from the peripheral region of the panel 11, that is, a light beam on the large angle side enters a first surface S1 of the first lens L1 on the observer side at a large incident angle, for example, about 35° to 40°. In this case, a transmittance depends very much on some polarization directions of a components emitted from the first lens L1 because of Fresnel reflection, and thus luminance unevenness may occur in an image.

Figure 2:
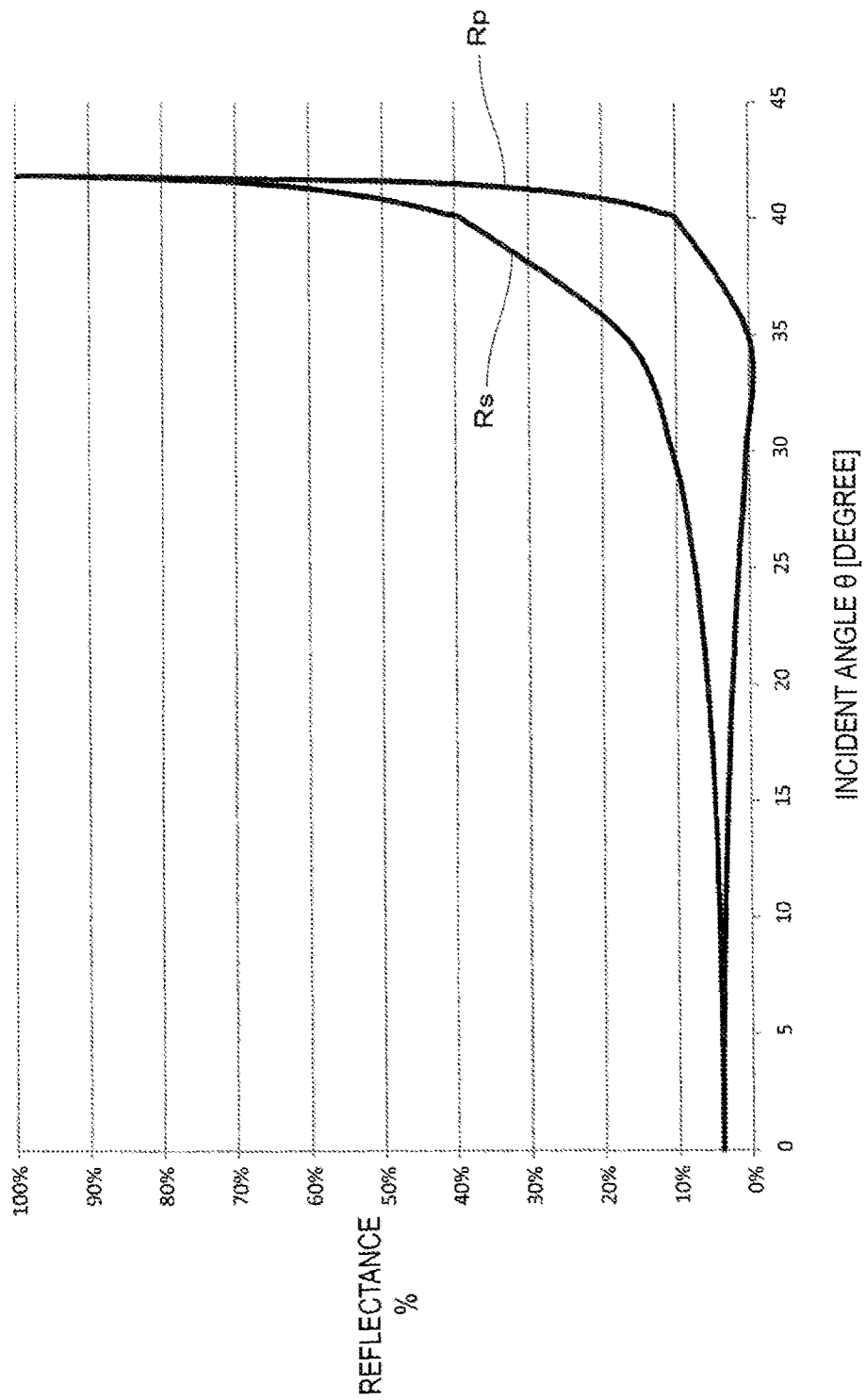
FIG. 2 is a graph illustrating Fresnel reflection amounts.

FIG. 2 is a graph illustrating Fresnel reflection amounts where light is emitted from a lens with a refractive index of 1.5 to air with a refractive index of 1 at an incident angle θ in the air. Specifically, FIG. 2 illustrates a curve Rp representing p-polarization characteristics and a curve Rs representing s-polarization characteristics, plotted with the incident angle θ as the abscissa and the reflectance (%) as the ordinate. In FIG. 2, when light enters from the first lens L1 to air (where light is emitted from a lens to air) at an incident angle θ of 40°, the transmittances in p-polarization direction and s-polarization direction are 90% and 60%, respectively, resulting in a difference in transmittance as large as 30%. In other words, when the incident angle is large, p-polarized light passes through the first lens L1 much more than s-polarized light. Furthermore, depending on the polarization state, a large difference in transmittance between a part where the incident angle is large (a peripheral region in an image) and a part where the incident angle is small (a center region in the image) may occur. That may cause clear luminance unevenness due to, for example, the difference in luminance between the center region and the peripheral region in the video.

On the other hand, it is known that the human eyes have characteristics which more easily sense luminance unevenness and the like in the horizontal direction (the X direction, the left-and-right direction) than in the vertical direction (the Y direction, the up-and-down direction). Accordingly, it is more significant to reduce image unevenness in the horizontal direction. In more detail, human angle of view is described. The human angle of view is defined by about 200° in the horizontal direction and about 125° in the vertical direction (lower 75°, upper 50°). Of the angles, an effective field of view, which provides an excellent performance of information capacity, is defined by about 30° in the horizontal direction and about 20° in the vertical direction. A stable gaze field, in which gaze position can be quickly stabilized for viewing, is defined by 60° to 90° in the horizontal direction and 45° to 70° in the vertical direction. As a result, the human field of view is wider in the horizontal direction than in the vertical direction, and many types of displays have a larger dimension in the horizontal direction than in the vertical direction accordingly (typically, 4:3 or 16:9). In this respect, it is easier to sense luminance unevenness in the horizontal direction than in the vertical direction, and this leads to a demand for further preventing image unevenness in the horizontal direction.

Taking the effect of Fresnel reflection into account and also in light of the human-eye characteristics, First Exemplary Embodiment provides a configuration that prevents luminance unevenness in an image to allow the observer to view a high quality image.

Figure 3:
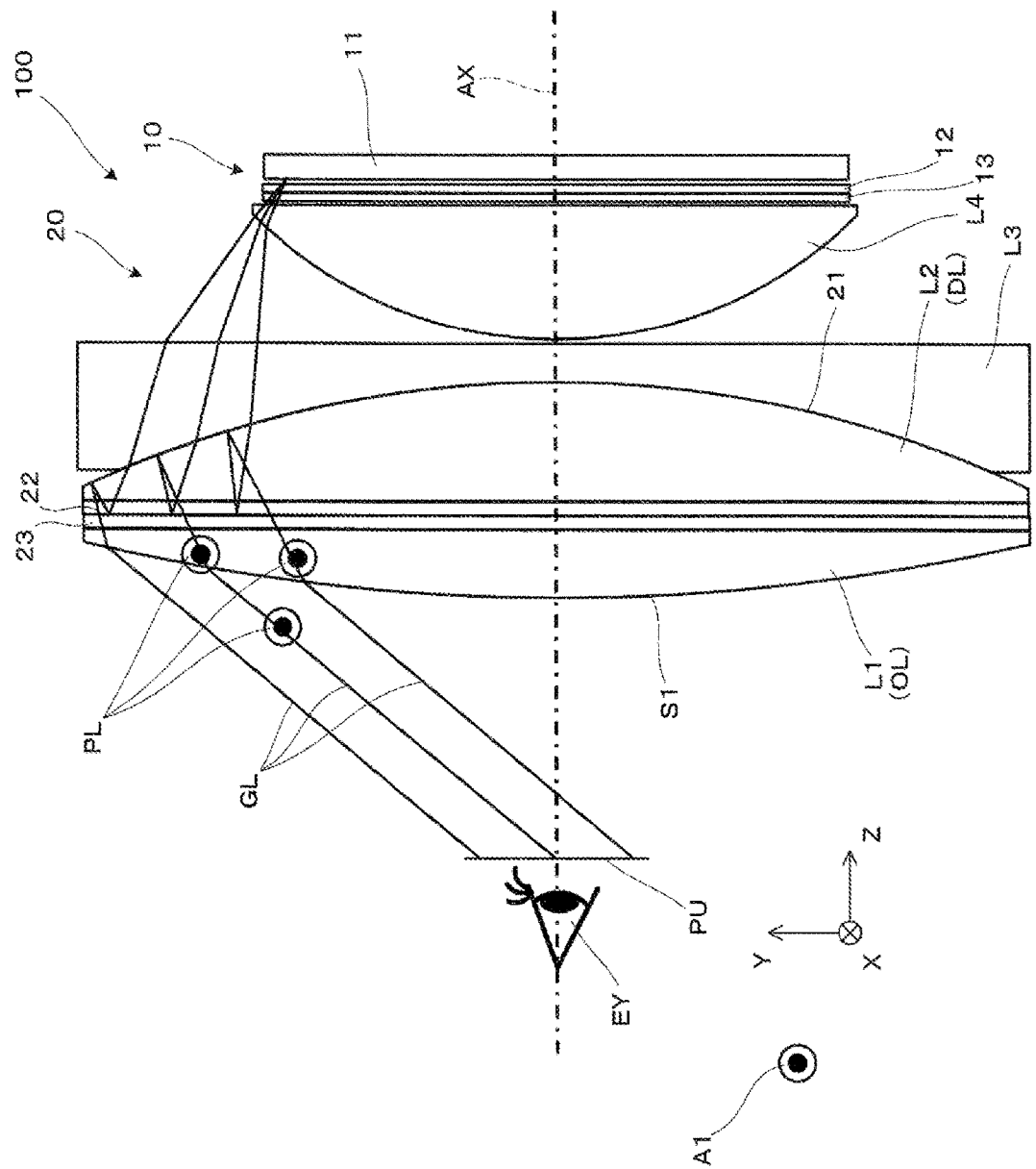
FIG. 3 conceptually illustrates the virtual image display device being mounted, when viewed from the side.
Figure 4:
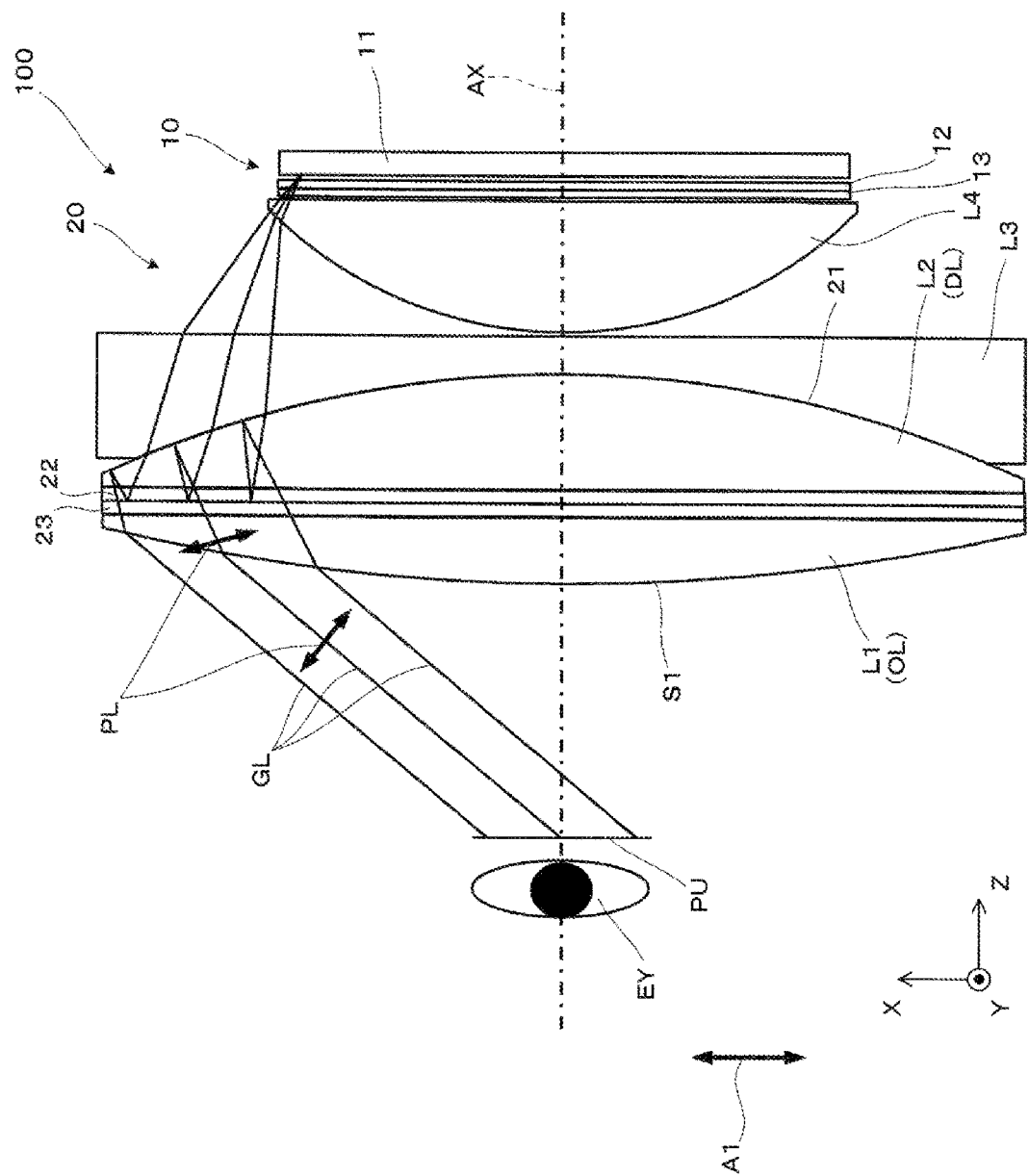
FIG. 4 conceptually illustrates the virtual image display device being mounted, when viewed from above.

With reference to FIG. 3 and FIG. 4, a difference in characteristics of the image light GL in the vertical and horizontal directions in the virtual image display device 100 is described below. FIG. 3 is a view of the virtual image display device 100 in the horizontal direction (the X direction) in the state where the observer wears the virtual image display device 100 (when viewed from the side). In contrast, FIG. 4 is a view of the virtual image display device 100 in the vertical direction (the Y direction) (when viewed from above). FIG. 4 also corresponds to FIG. 1. FIG. 3 illustrates components of light beams in the upper field of view, of the image light GL, and FIG. 4 illustrates components of light beams in the outer field of view (the left outside), of the image light GL.

FIG. 3 and FIG. 4 differ in consideration of the polarization direction of component light PL that is a component passing through the semi-transmissive polarizing plate 23 with respect to the first surface S1 of the first lens L1. Specifically, in FIG. 4, as described with reference to FIG. 1, the optical path of the image light GL passes in a plane parallel to the XZ plane. In FIG. 4, for p-polarized light and s-polarized light, it is defined that the incident surface is parallel to the XZ plane, and the boundary surface is perpendicular to the XZ plane (i.e., parallel to the Y direction). Accordingly, in other words, it can be considered that the semi-transmissive polarizing plate 23 transmits p-polarized light and reflects s-polarized light, and the component light PL passing through the semi-transmissive polarizing plate 23 is still p-polarized light on the first surface S1 of the first lens L1.

On the other hand, in FIG. 3, the optical path of the image light GL passes in a plane parallel to the YZ plane, and for p-polarized light and s-polarized light, it is defined that the incident surface is parallel to the YZ plane, and the boundary surface is perpendicular to the YZ plane (i.e., parallel to the X direction). In simple terms, the definitions of p-polarized light and s-polarized light are switched between FIG. 1 and FIG. 4. Accordingly, it is considered that the component light PL, which is a component that has passed through the semi-transmissive polarizing plate 23, is s-polarized light on the first surface S1 of the first lens L1.

In this case, first, in FIG. 3, of the image light GL, the component light PL that has passed through the semi-transmissive polarizing plate 23 on the upper side (the +Y side) in the direction A1 of the axis enters the first surface S1 of the first lens L1 as s-polarized light. Assuming that the incident angle of the component light PL entering the first surface S1 is about 40° and referring to FIG. 2, the polarizing transmission component of about 30% is reflected and returns to the inside of the lens, and the component of the remaining 70% is emitted from the first surface S1 and then reaches the eye EY.

On the other hand, in FIG. 4, of the image light GL, the component light PL that has passed through the semi-transmissive polarizing plate 23 on the outer side (the +X side) in the direction A1 of the polarizing transmission axis enters the first surface S1 of the first lens L1 as p-polarized light. Assuming that the incident angle of the component light PL entering the first surface S1 is about 40° and referring to FIG. 2, the component of about 10% is reflected and returns to the inside of the lens, and the component of the remaining 90% is emitted from the first surface S1 and then reaches the eye EY.

In these examples, an image with less luminance unevenness in the horizontal direction (the X direction) is displayed.

As described above, in the virtual image display device 100 of First Exemplary Embodiment, while the half mirror 21 provided in an optical path bends the optical path, and thus the virtual image display device 100 has a wide angle of view and is downsized, the semi-transmissive polarizing plate 23 with a high transmittance increases the amount of the image light GL in the direction A1 along the alignment of the eyes of the observer and thus reducing luminance unevenness in the central region and the peripheral region in the image in that direction to allow the observer to view a high quality image.

Figure 5:
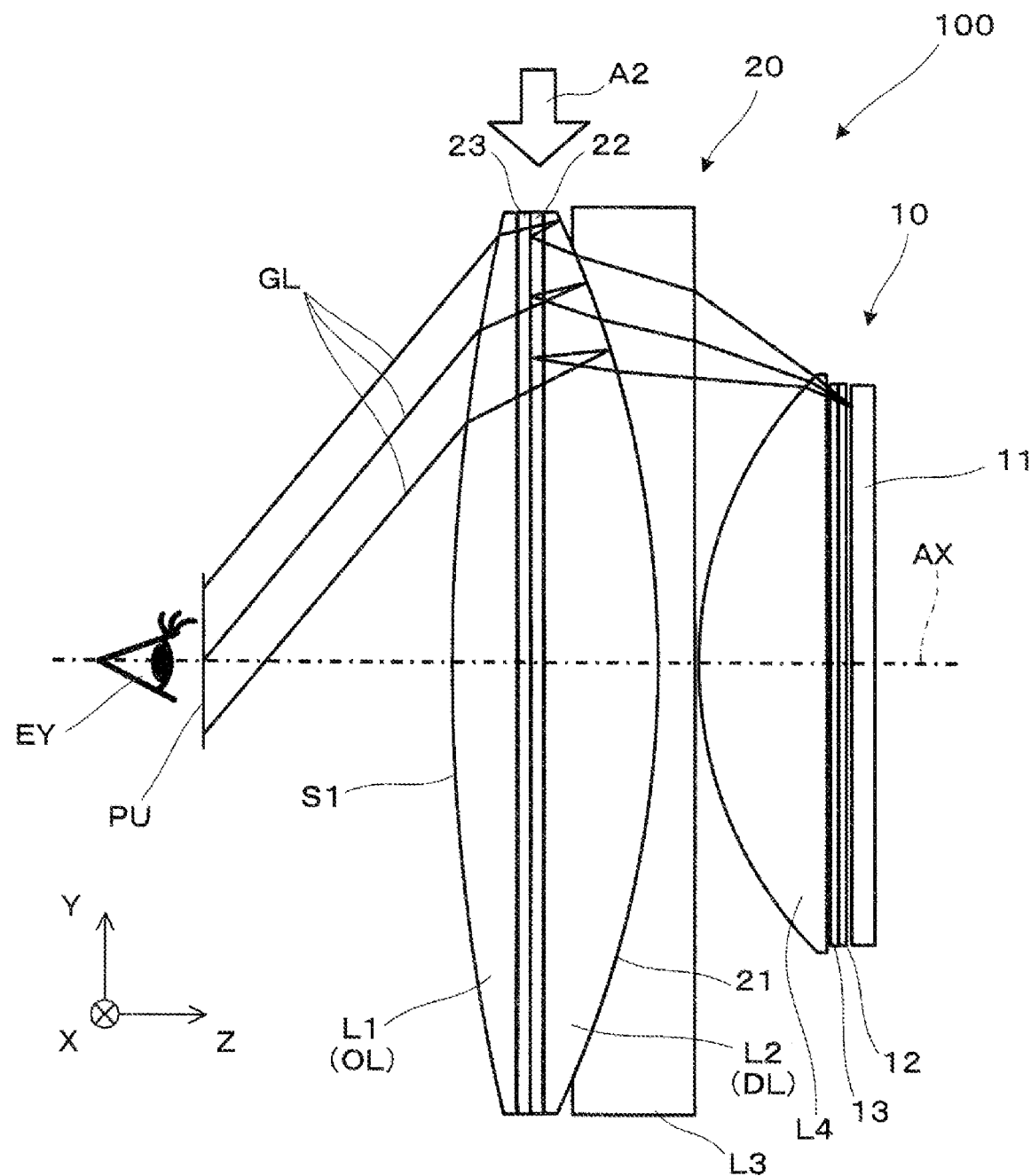
FIG. 5 illustrates an example of lens molding.

With reference to FIG. 5 and the like, an example of fabrication of an optical system, which includes molding of the lenses including the first lens L1, is described below.

As described above, each of the lenses including the first lens L1 is preferably configured with a glass lens, a zero-birefringence resin lens, or a low-birefringence resin lens. This is because in a typical optical system, due to the effect of birefringence, a different refractive index depending on the polarization direction affects the resolution performance, and thus, in a polarization optical system, further affects the polarization state of passing light. Specifically, birefringence significantly affects the transmittance of light when passing through a polarizing plate and the like, thus causing remarkable luminance unevenness. In particular, as for the second lens L2, the image light GL passes through the second lens L2 three times in total by traveling back and forth. Accordingly, a lower birefringence material is to be used. In terms of preventing birefringence, the use of a glass material for the related components can reduce the effect of birefringence. However, in terms of needs for a reduced-weight HMD, they are preferably formed from a resin lens. In this respect, the case where the second lens L2 and the like are configured with a resin lens is described. Relatively-low birefringence resins include PMMA and ZEONEX (registered trademark), while lower birefringence resins being available include, for example, Iupizeta (registered trademark) EP-4000 to EP-6000 manufactured by Mitsubishi Gas Chemical Co., Inc. Here, a resin lens that is configured with such a material and has an oriented birefringence of not greater than 0.01 and not less than −0.01 or a photoelastic constant of not greater than 10 [$10^{-12}$/Pa] is referred to as a low-birefringence resin lens or a zero-birefringence resin lens.

Figure 6:
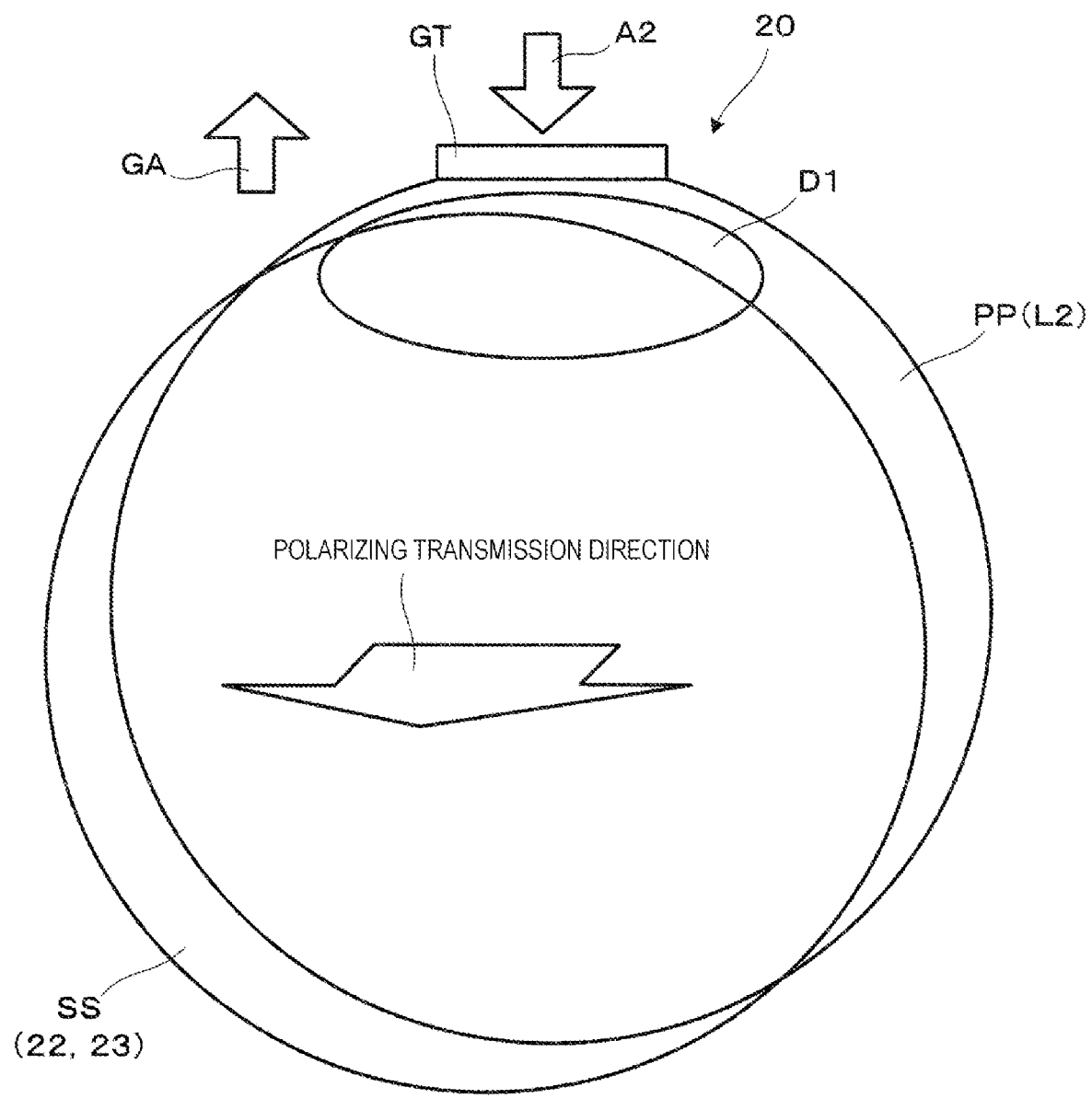
FIG. 6 illustrates the example of lens molding.
Figure 7:
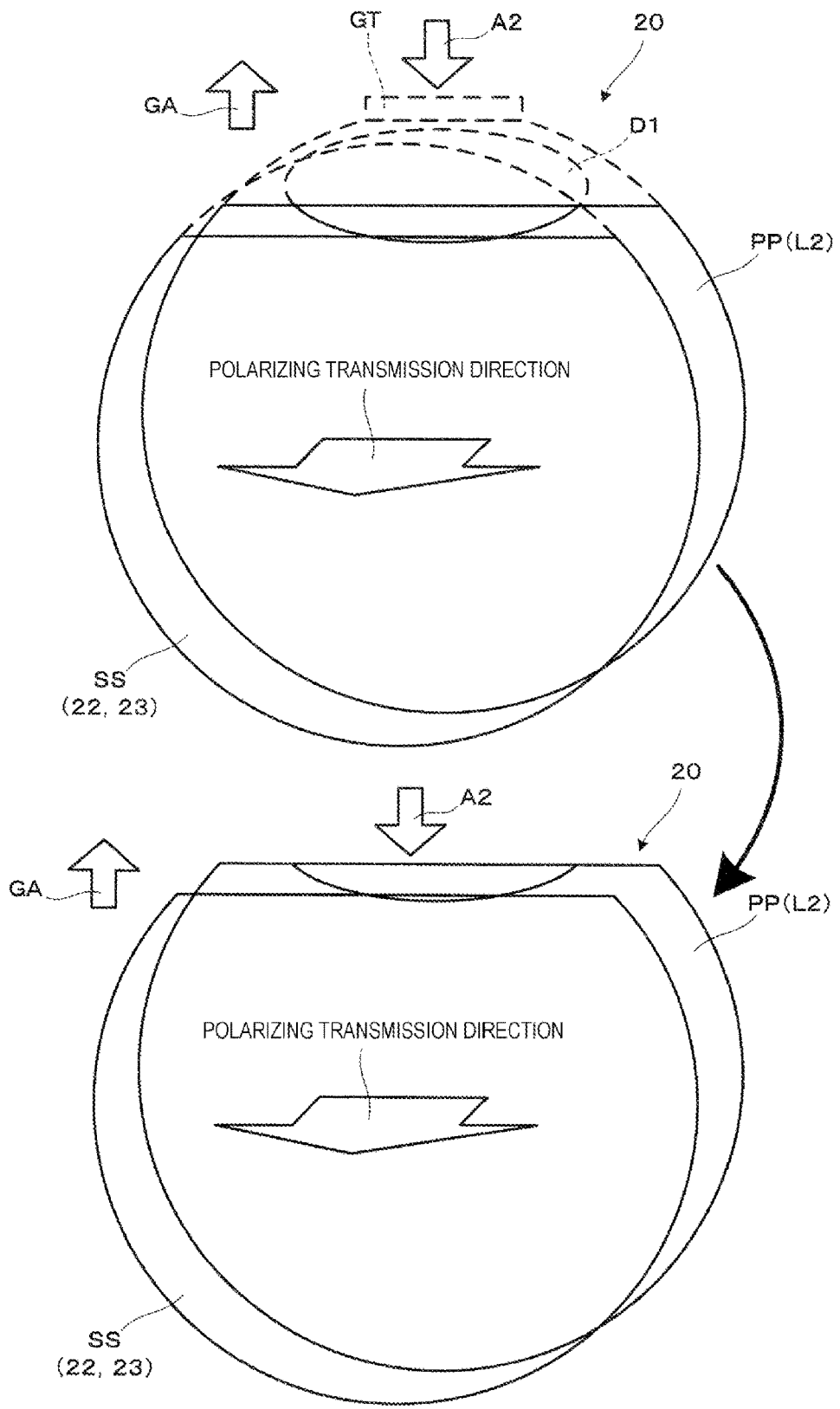
FIG. 7 illustrates the example of lens molding.

FIG. 5, FIG. 6, and FIG. 7 illustrate an example of lens molding. Of these figures, FIG. 5 illustrates a relationship between the orientation of the lens and a gate GT in molding the lens in the state where the product is worn. The relationship is seen from FIG. 6 which illustrates a member PP after injection-molded to be processed into the second lens L2. Specifically, the arrow A2 illustrated in FIG. 5 and FIG. 6 indicates a direction of arranging the gate. In FIG. 5, the gate arranged direction is on the upper side of the observer (the +Y side). In other words, the gate side during the molding faces upward in the state where the virtual image display device 100 is worn.

In FIG. 6, residual stress may easily arise in a region D1 around the gate during molding of a resin lens in relation to the flow during the molding. As a result, when the virtual image display device 100 is used, the image light GL that has passed through a portion corresponding to the region D1 is subject to luminance unevenness. Thus, by taking advantage of the characteristics of the human eye, which are generally known as having a narrow field of view on the upper side and a wide field of view on the lower side, the lens is disposed with its gate side portion located on the upper side (the +Y side), at a position such that the observer does not substantially sense the effect of image unevenness. Therefore, the quality of a visible image may be improved. In that configuration, as illustrated in FIG. 7, the lens may be D-shaped (D-cut lens) by cutting and removing a portion of a circular lens illustrated in FIG. 6. In other words, the lens may be an asymmetrical lens. Positioning a part of the gate GT at the portion that is subjected to D-cutting (i.e., positioning the face at a portion to be subjected to D-cutting as the D-shaped face obtained by cutting the gate side in the molding) makes the portion corresponding to the region D1 easily removed, allows the gate GT with a larger cross-sectional area to be arranged. This can improve formability, provide high precision molding, and thus prevent a flow mark from occurring. The lens may be molded into a circular shape and then be subject to machine-cutting. As described above, partially cutting out the portion that includes a gate GT side enables a configuration in which the region D1 having high residual stress is used as little as possible.

Furthermore, as described above, while a gate side direction of the member PP to be processed into the resin lens in FIG. 6 is aligned with a vertically upward direction GA, that is, the +Y direction in FIG. 5, a member SS to be processed into the semi-transmissive polarizing plate 23 (wire-grid polarizing plate) or the polarization converting member 22 (¼ wavelength plate) may be bonded in a direction according to the member PP to be processed into the lens. Specifically, in the case of the semi-transmissive polarization plate 23, the semi-transmissive polarizing plate 23 may be bonded such that the transmission axis of the semi-transmissive polarizing plate 23 is perpendicular to the gate direction (at 90° or approximately 90°). Thus, the transmission axis of the semi-transmissive polarization plate 23 is horizontal. The member PP to be processed into the lens and the member SS to be processed into the semi-transmissive polarizing plate 23 (wire-grid polarizing plate) are bonded to each other directly or through another member, and thus are handled as one unit.

Figure 8:
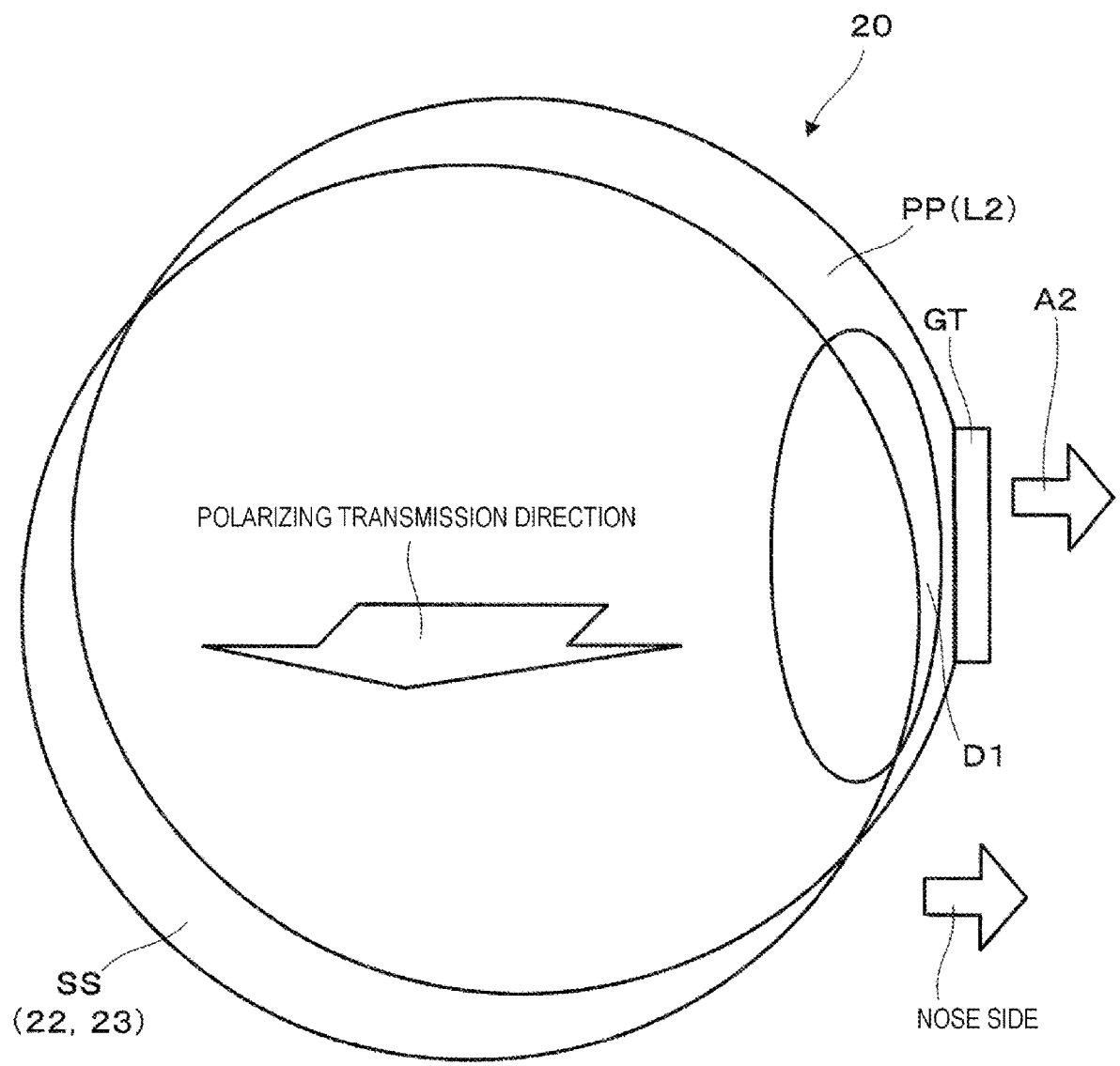
FIG. 8 illustrates another example of lens molding.

FIG. 8 illustrates another example of lens molding described above. As illustrated in FIG. 8, the member PP to be processed into the resin lens is disposed such that the gate side during the molding is on the nose side in the state where the virtual image display device 100 is worn. In other words, the resin lens is disposed with the gate side facing the nose of the observer in the state where the virtual image display device 100 is worn. Furthermore, the member SS to be processed into the semi-transmissive polarizing plate 23 (wire-grid polarizing plate) is bonded to the member PP such that the transmission axis of the semi-transmissive polarizing plate 23 is in the horizontal direction. Residual stress on the nose side due to the position of the gate GT may cause some luminance unevenness in image light corresponding to the nose side. However, the human field of view in the nose side direction (the inward direction) is narrower than the field of view in the ear side direction (the outward direction). Therefore, making an angle of view of image light smaller on the nose side only will not substantially affect the whole field of view. For example, performing display correction on the panel side to partially cut out a display region corresponding to the nose side in an image to be displayed can eliminate image light corresponding to the nose side, and thus image light corresponding to a region where luminance unevenness likely occurs can be eliminated in advance.

With that configuration, the gate arranged portion may be subject to D-cutting, as in the case of FIG. 7.

The partial cutting has an advantageous effect of reduced weight or easy positioning.

Furthermore, as in the case described above, the member SS to be processed into the semi-transmissive polarizing plate 23 (wire-grid polarizing plate) or the polarization converting member 22 (¼ wavelength plate) may be bonded to the member PP to be processed into the lens such that the direction of the member SS corresponds to the member PP. Specifically, it is conceivable that, in the case of the semi-transmissive polarization plate 23, the semi-transmissive polarizing plate 23 may be bonded such that the transmission axis of the semi-transmissive polarizing plate 23 is parallel to the gate direction (in the same direction). Thus, the transmission axis of the semi-transmissive polarization plate 23 is horizontal.

Second Exemplary Embodiment

Figure 9:
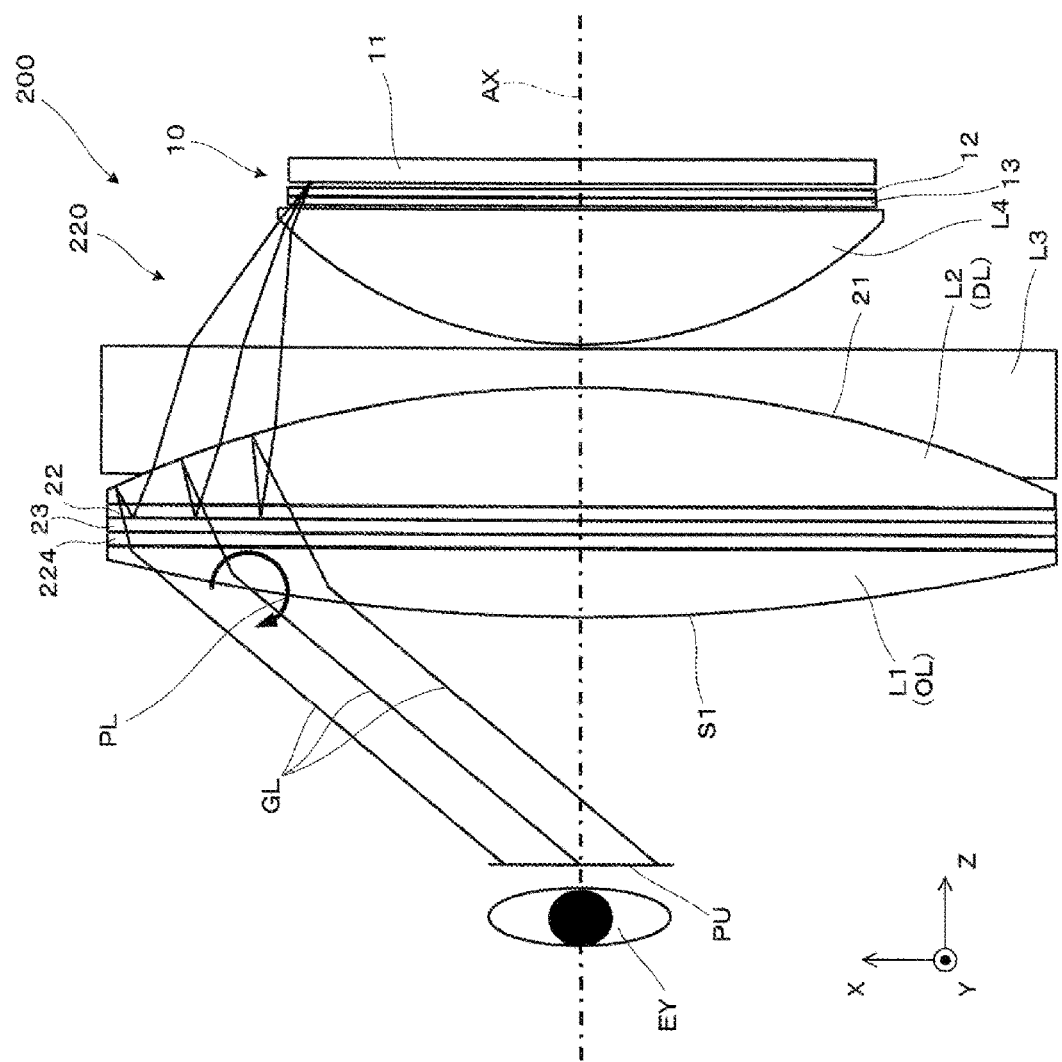
FIG. 9 conceptually illustrates a virtual image display device according to Second Exemplary Embodiment.

A virtual image display device according to Second Exemplary Embodiment will be described below with reference to FIG. 9. Second Exemplary Embodiment is identical to First Exemplary Embodiment, except that a circularly-polarized light converting member serving as a third ¼ wavelength plate (λ/4 plate) is provided, and a detailed description of like elements is omitted.

In a virtual image display device 200 according to Second Exemplary Embodiment, a magnification optical system 220 includes a circularly-polarized light converting member 224, which serves as a third ¼ wavelength plate, between the semi-transmissive polarizing plate 23 and the first lens L1 serving as the observer-side lens OL, that is, on the emission side of the wire-grid polarizing plate. In this case, a component that has passed through the semi-transmissive polarizing plate 23 (linearly-polarized light) is converted into circularly-polarized light by the circularly-polarized light converting member 224 and emitted as the component light PL, and then enters the first lens L1 (the observer-side lens OL). With that configuration, a difference in transmittance between p-polarized light and s-polarized light, when the light passes through the first surface S1 of the first lens L1, is eliminated.

In Second Exemplary Embodiment, while the half mirror 21 provided in an optical path bends the optical path and thus the virtual image display device has a wide angle of view and is downsized, the image light is converted into circularly-polarized light and emitted and thus a difference in transmittance between p-polarized light and s-polarized light is eliminated to allow the observer to view a high quality image.

Third Exemplary Embodiment

Figure 10:
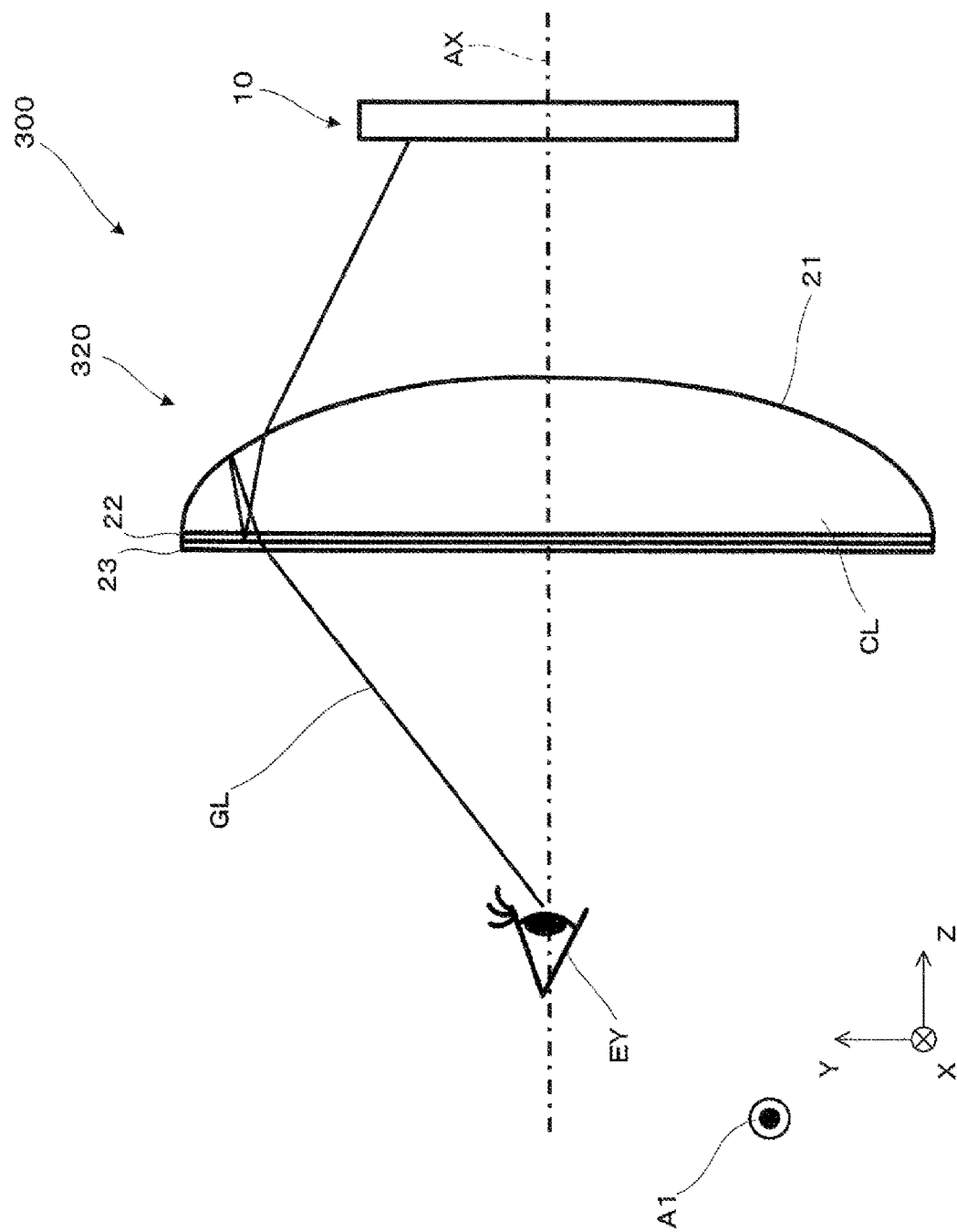
FIG. 10 conceptually illustrates a virtual image display device according to Third Exemplary Embodiment.

A virtual image display device according to Third Exemplary Embodiment will be described below with reference to FIG. 10. Third Exemplary Embodiment is identical to First Exemplary Embodiment, except that the magnification optical system is configured with a single lens, and a detailed description of like elements is omitted. A magnification optical system 320 includes a single condenser lens CL, the half mirror 21, the polarization converting member 22, and the semi-transmissive polarizing plate 23. The condenser lens CL is configured with a glass lens, a zero-birefringence resin lens, or a low-birefringence resin lens, and thus birefringence is less likely to occur.

The condenser lens CL is a flat convex lens having a convex surface on the image display unit 10 side and a flat surface on the observer side, and collects image light emitted from the image display unit 10 serving as an image element. The half mirror 21 is provided before the condenser lens CL (on the upstream side of the optical path), the polarization converting member 22 is provided after the condenser lens CL (on the downstream side of the optical path), and the semi-transmissive polarizing plate 23 is provided after the polarization converting member 22 (on the downstream side of the optical path). In Third Exemplary Embodiment, the half mirror 21, the polarization converting member 22, and the semi-transmissive polarizing plate 23 are bonded to the respective surfaces of the condenser lens CL.

As described above, in the image display unit 10, the image light GL converted into circularly-polarized light and emitted passes through the half mirror 21, is converted into s-polarized light by the polarization converting member 22, and then reaches the semi-transmissive polarizing plate 23, in the magnification optical system 320. The s-polarized image light GL is reflected by the semi-transmissive polarizing plate 23, again converted into circularly-polarized light by the polarization converting member 22, and then reaches the half mirror 21. While some components of the image light GL pass through the half mirror 21, the other components of the image light GL are reflected by the half mirror 21, and the reflected components of the image light GL are then converted into p-polarized light by the polarization converting member 22. The components of the p-polarized image light GL pass through the semi-transmissive polarizing plate 23, and then reach the pupil position PU that is assumed as the position of the eye EY of the observer.

In Third Exemplary Embodiment, while the half mirror provided in an optical path in the virtual image display device bends the optical path and thus the virtual image display device has a wide angle of view and is downsized, the polarization converting member provided between the half mirror and the semi-transmissive polarizing plate properly converts the polarization state of the component traveling between the half mirror and the semi-transmissive polarizing plate, and thus ghost light is prevented from occurring to allow the observer to view a high quality image.

OTHER EXEMPLARY EMBODIMENTS

The disclosure is provided through some exemplary embodiments described above, but is not limited thereto. Various changes may be made without departing from the scope of the disclosure.

Figure 11:
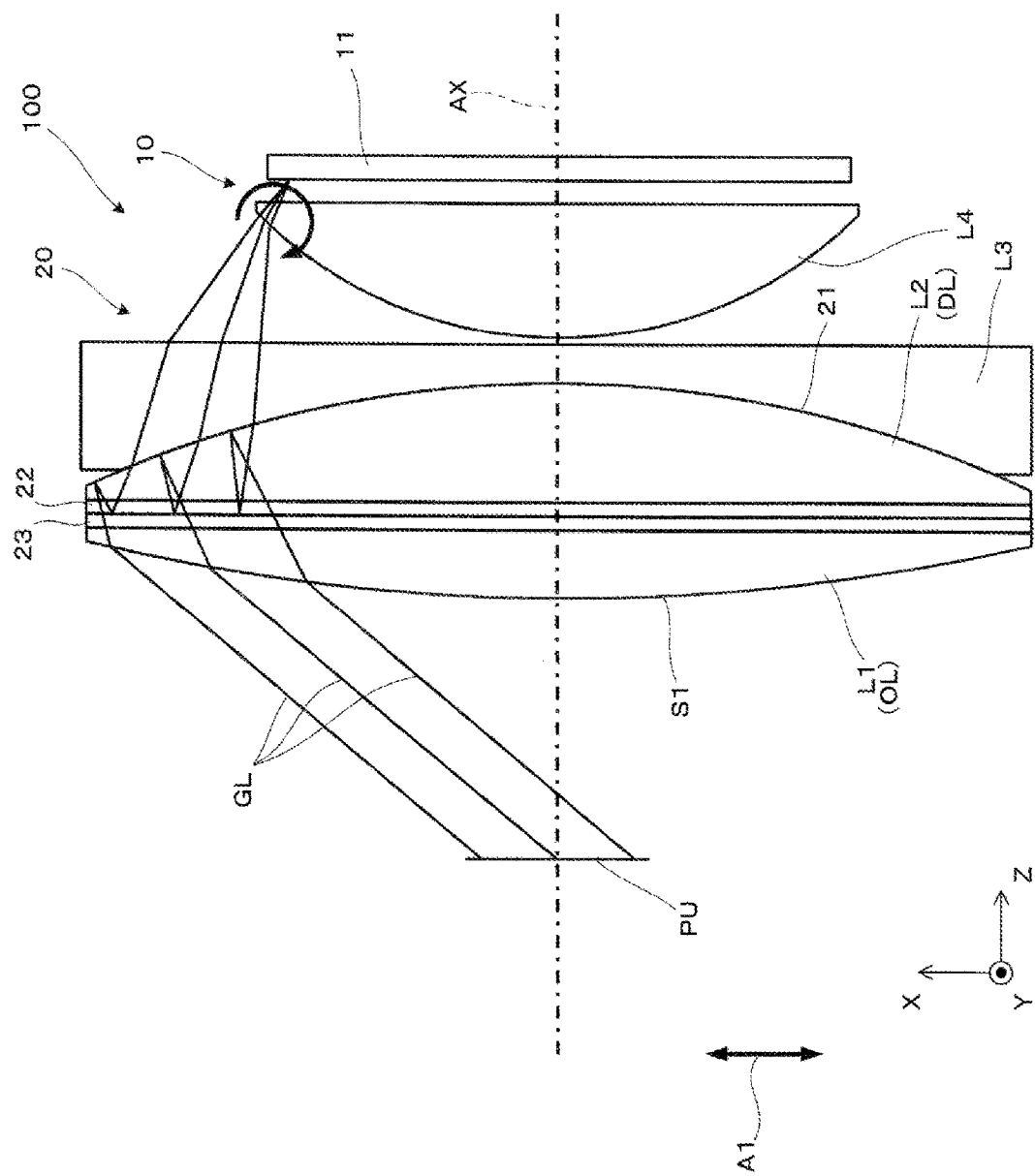
FIG. 11 conceptually illustrates a virtual image display device according to a modified example.

In the exemplary embodiments described above, the image display unit 10 includes a self light-emitting element such as an organic electroluminescent element (OLED). In this case, as illustrated as a modified example in FIG. 11, when the image display unit 10, which emits the circularly-polarized image light, is employed, for example, a configuration, in which only the panel 11 including a self light-emitting element is disposed, and a structure that can extract the polarized light at the light emission portion of the OLED is provided, can be employed, while the polarizing plate and the ¼ wavelength plate may be omitted. Alternatively, by using a liquid crystal panel as the panel 11 configured to emit linearly-polarized light, only a ¼ wavelength plate may be arranged without the provision of the polarizing plate.

The image display unit 10 may be a type of high temperature poly-silicon (HTPS) panel serving as a transmissive liquid display device, or any other type, such as a structure using a reflective liquid crystal display device, and a structure using a digital micromirror device in place of the image display element including the liquid crystal display device.

Each lens may have an anti-reflection coating on the surface as appropriate to substantially prevent ghost light from occurring.

The technique of the disclosure may be applied to a closed type (not see-through) of virtual image display device, which allows the observer to view only image light, a see-through type that allows the observer to view or observe the outside image, or a so-called video see-through product, which includes a display and an image capturing device.

In the configurations described above, the magnification optical system may be configured with various numbers of lenses. For example, the magnification optical system 20 in First Exemplary Embodiment includes the four lenses but may include two lenses of the first lens L1 and the second lens L2.

The formation of the lens member to be the second lens L2 and the like is performed by injection-molding a resin lens as an example. However, each lens may be formed in another way of molding a resin lens, and may be formed by glass-molding in the case where the lens is a glass lens.

Figure 12A:
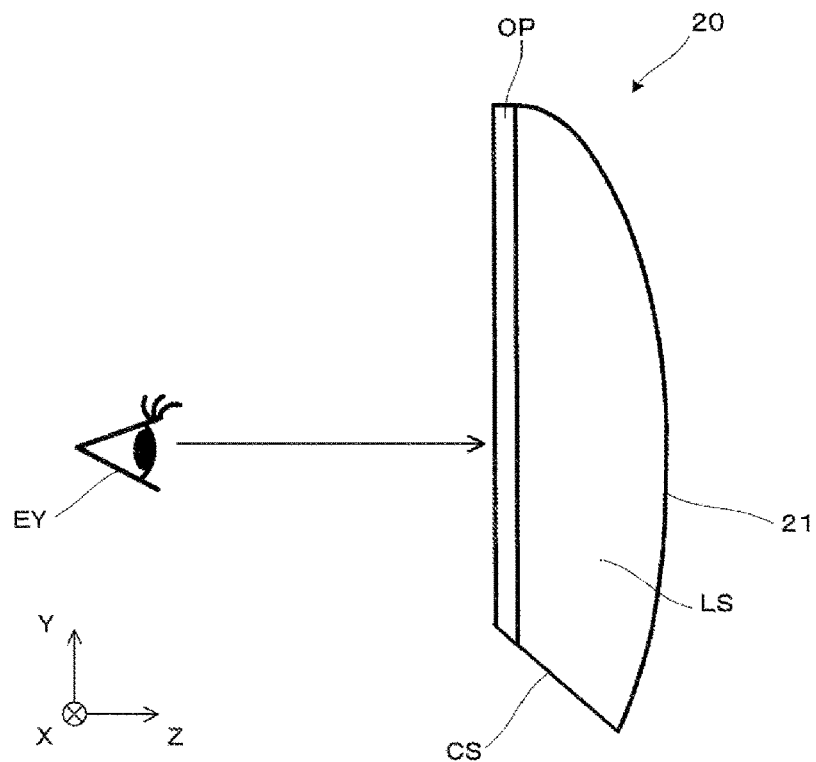
FIG. 12A illustrates a shape of an end face of a modified example of a lens/an optical component.
Figure 12B:
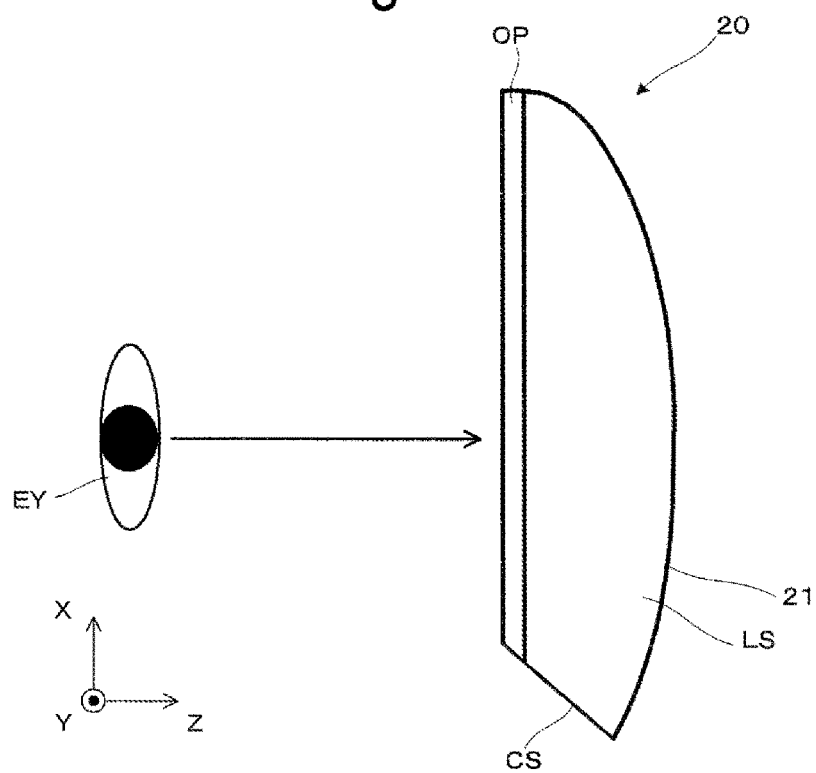
FIG. 12B illustrates the shape of the end face of the modified example of a lens/an optical component.

Furthermore, various aspects can be conceived for partial cutting (removing) of the lens and the like in terms of cutting directions. For example, as conceptually illustrated in FIG. 12A and FIG. 12B, a lens end face CS that is the end face of a cut-out section of a lens or an optical element (e.g., a lens LS and an optical element OP of the magnification optical system 20) may be shaped such that it is inclined downward (the −Y direction) toward the +Z direction when viewed from the side and inclined wider in the left-and-right direction (the −X direction in FIG. 12B) toward the +Z direction when viewed from above, or may be tapered. Accordingly, the lens and others have a shape conforming to the shape of the nose of the observer.

Figure 13:
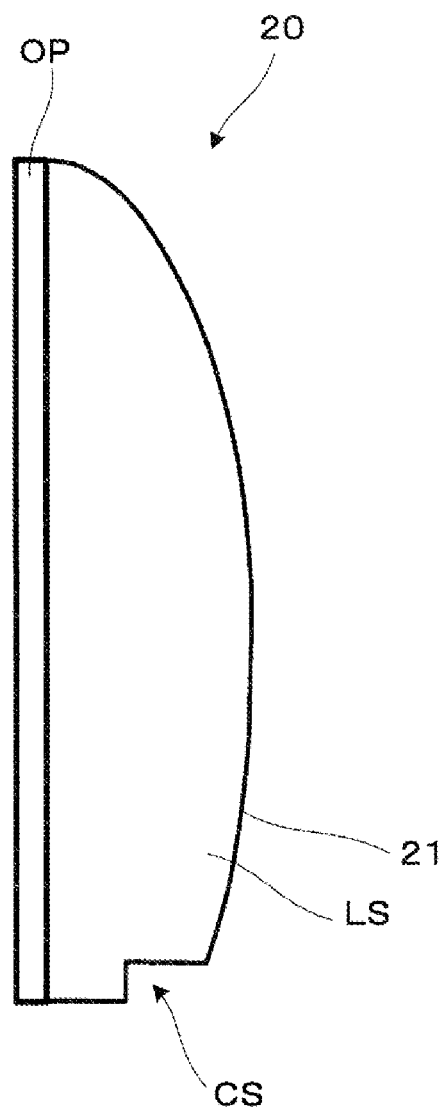
FIG. 13 illustrates an end face of another modified example of a lens.

As illustrated in FIG. 13, the lens may be stepped such that the lens end face CS is partly shaped to have a step. Such a step shape of the lens end face CS can be used for positioning.

Figure 14:
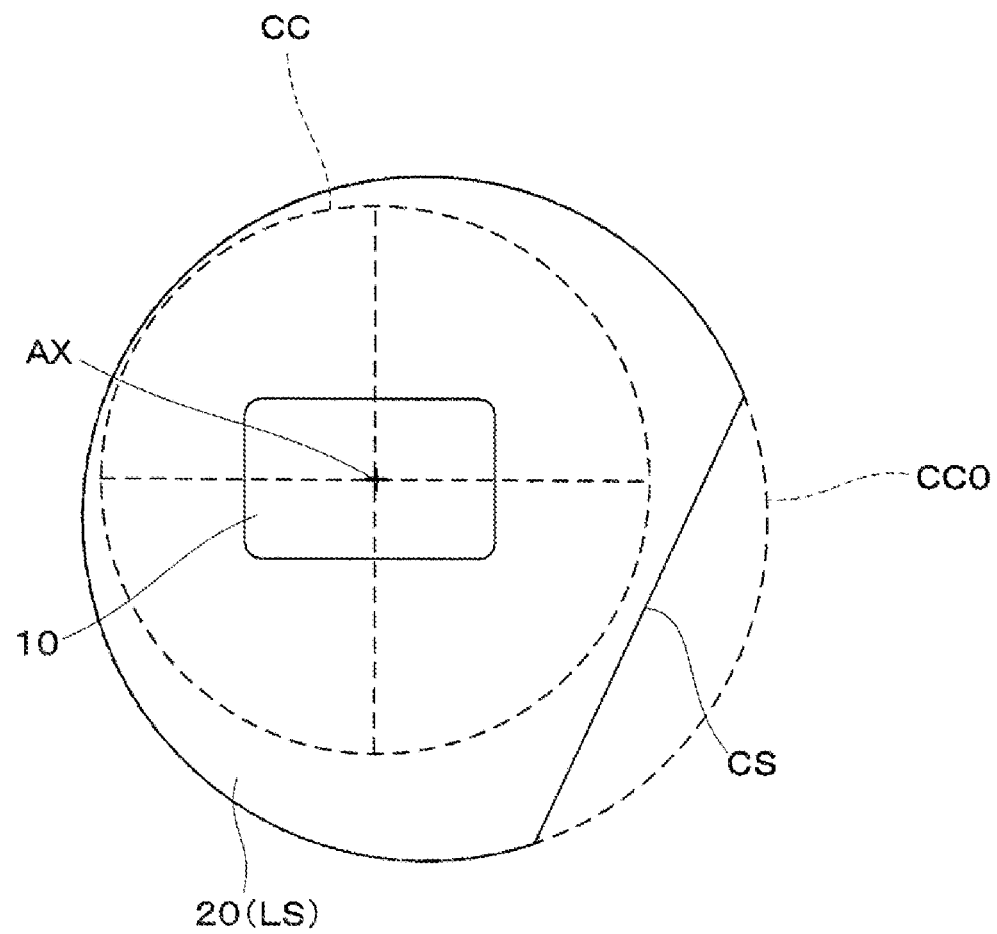
FIG. 14 illustrates a modified example of arrangement of a lens and an image element.

In the examples described above, regarding the lens, the center of a circular member (the center of a circle) before the lens is cut is referred to as the optical axis AX, and the center position of the image display unit 10 is aligned with the optical axis AX, which is the center of the circular member before the lens is cut. However, supposing that the original circular is modified in its shape when the lens is cut, the center point may be set to be shifted away from the lens end face CS. Specifically, as an example illustrated in FIG. 14, the position of the optical axis AX may be shifted from the center of an outline CC0 of the shape (circle) before the lens is cut, which is represented by the broken line. In other words, an outline CC of the circle centered at the optical axis AX, which is represented by the broken line, may not be concentric with the outline CC0 but deviated and shifted away from the lens end face CS. In this situation, the center position of the image display unit 10 may also be aligned with the shifted optical axis AX. Alternatively, an off-axis optical system and the like may be used to have an identical configuration.

Furthermore, a left and right pair may be configured based on a reference value (e.g., 65 mm) of the interpupillary distance that is the distance between the left and right eyes. In accordance with this, the cutting shape to be used for cutting may be designed.

What is claimed is:
1. A virtual image display device, comprising:
an image display unit comprising:
an image element configured to emit image light for displaying an image;
a first polarizing plate that is configured to convert the image light emitted from the image element into linearly-polarized light and to extract a component of the linearly-polarized light; and
a first ¼ wavelength plate that is configured to convert the component extracted by the first polarizing plate into circularly-polarized light;
a display-side lens on which the image light including the circularly-polarized light from the image element is incident;
an achromatic lens provided before the display-side lens, the achromatic lens being a concave lens that is bonded to the display-side lens;
a front-side lens provided immediately after the image display unit, the front-side lens being disposed between the image display unit and the achromatic lens, and being configured to emit the image light received from the image display unit,
the first polarizing plate and the first ¼ wavelength plate being disposed between the front-side lens and the image element;
an observer-side lens provided after the display-side lens, the observer-side lens being configured to collect the image light from the display-side lens to emit collected image light to a front side of an eye of an observer;
a half mirror interposed between the achromatic lens and the display-side lens; and
a second polarizing plate that is a semi-transmissive polarizing plate provided between the display-side lens and the observer-side lens and having a polarizing transmission axis in a horizontal direction that is a direction of alignment of eyes of the observer.
2. The virtual image display device according to claim 1, further comprising:
a polarization converting member provided before the semi-transmissive polarizing plate, the polarization converting member being configured to convert a polarization state of passing light.

3. The virtual image display device according to claim 2, wherein
the polarization converting member is a second ¼ wavelength plate and is provided between the display-side lens and the semi-transmissive polarizing plate, the polarization converting member being configured to convert a component of light traveling toward the semi-transmissive polarizing plate into linearly-polarized light.

4. The virtual image display device according to claim 1, wherein
the semi-transmissive polarizing plate is a reflective wire-grid polarizing plate.

5. The virtual image display device according to claim 1, wherein
the half mirror has a concave curved shape when viewed from the observer side.

6. The virtual image display device according to claim 1, wherein
at least one of the display-side lens and the observer-side lens is a resin lens having at least one of an oriented birefringence of not greater than 0.01 and not less than −0.01, and a photoelastic constant of not greater than 10 $[10^{-12}/Pa]$.

7. The virtual image display device according to claim 6, wherein
the resin lens is disposed with a gate side of the resin lens during molding facing upward when the virtual image display device is worn.

8. The virtual image display device according to claim 7, wherein
the resin lens has a D shape with a cut face on the gate side of the resin lens during molding.

9. The virtual image display device according to claim 6, wherein
the resin lens is disposed with a gate side of the resin lens during molding facing the nose of the observer when the virtual image display device is worn.

10. The virtual image display device according to claim 6, wherein
the semi-transmissive polarizing plate and the resin lens are bonded to each other to correspond a gate direction of the resin lens to a direction of a transmission axis of the semi-transmissive polarizing plate.

11. The virtual image display device according to claim 1, wherein
at least one of the display-side lens and the observer-side lens is a glass lens.

12. The virtual image display device according to claim 1, wherein
the image element includes a self light-emitting element configured to emit circularly-polarized image light.

13. The virtual image display device according to claim 1, further comprising:
a circularly-polarized light converting member provided between the semi-transmissive polarizing plate and the observer-side lens, the circularly-polarized light converting member being configured to convert a polarizing state of the image light emitted from the semi-transmissive polarizing plate into circular-polarization.

14. A virtual image display device, comprising:
an image display unit comprising:
an image element configured to emit image light for displaying an image;
a first polarizing plate that is configured to convert the image light emitted from the image element into linearly-polarized light and to extract a component of the linearly-polarized light; and
a first ¼ wavelength plate that is configured to convert the component extracted by the first polarizing plate into circularly-polarized light; and
a display-side lens configured to collect image light including the circularly-polarized light from the image element;
an achromatic lens provided before the display-side lens, the achromatic lens being a concave lens that is bonded to the display-side lens;
a front-side lens provided immediately after the image display unit, the front-side lens being disposed between the image display unit and the achromatic lens, and being configured to emit the image light received from the image display unit,
the first polarizing plate and the first ¼ wavelength plate being disposed between the front-side lens and the image element;
a half mirror interposed between the achromatic lens and the display-side lens;
a polarization converting member provided after the display-side lens to convert a polarization state of passing light; and
a second polarizing plate that is a semi-transmissive polarizing plate provided after the polarization converting member and having a polarizing transmission axis, in a horizontal direction that is a direction of alignment of eyes of an observer.

* * * * *